March 3, 1964    A. G. BOGGESS ETAL    3,122,803
CONNECTOR FOR FISHING TACKLE
Filed Dec. 20, 1961

INVENTORS
Hellen W. Boggess
Alpheus Guy Boggess
BY Fred C. Matheny
ATTORNEY

United States Patent Office 3,122,803
Patented Mar. 3, 1964

3,122,803
CONNECTOR FOR FISHING TACKLE
Alpheus Guy Boggess, Sitka, Alaska, and Hellen W. Boggess, P.O. Box 306, Sitka, Alaska; said Alpheus Guy Boggess assignor to said Hellen W. Boggess
Filed Dec. 20, 1961, Ser. No. 160,857
2 Claims. (Cl. 24—73)

Our invention relates to a connector which is particularly well adapted for use with fishing tackle but is capable of other uses.

An object of our invention is to provide a strong, simple, inexpensive and easily manipulated connector formed of a single piece of spring wire bent to provide two end-to-end U-shaped loops connected with each other by a diagonal medial member, each loop having at one end a hook which is readily engageable with and disengageable from the diagonal medial member.

Another object is to provide a connector of this type in which the hook that connects an end of one arm of each loop with the diagonal medial member is well shielded against snagging when it is engaged with said medial member.

Another object is to provide a connector of this type which is possessed of some tensile resiliency and which will be elongated and yield slightly if subjected to a hard pull or jerk, thus helping to absorb and cushion undesirable shocks to the tackle with which the connector is used and in this way reducing the danger of damaging the connector and the tackle connected with it.

Other objects of our invention will be apparent from the following description and accompanying drawings.

Like reference numerals refer to like parts throughout the several views.

Figure 1:
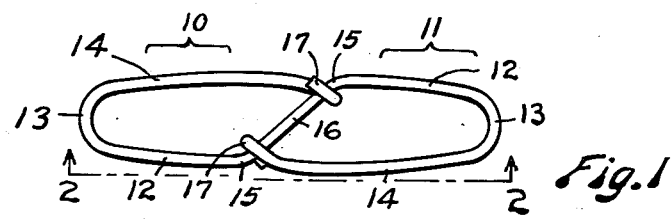
FIGURE 1 is a side view of a fishing tackle connector constructed in accordance with our invention, showing each of the two U-shaped end loops thereof in a closed or hooked position.
Figure 2:
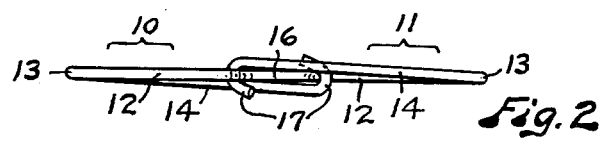
FIG. 2 is an edge view looking in the direction of broken line 2—2 of FIG. 1.

Our connector is formed of a single piece of spring wire suitably bent to provide two end-to-end U-shaped loops of duplicate construction, indicated generally by numerals 10 and 11. Each loop 10 and 11 comprises a shorter arm 12, an arcuate or approximately semicircular end part 13 and a longer arm 14. In this description the arcuate parts 13 are termed the outer ends and the adjoining parts of the two loops 10 and 11 the inner ends.

The inner end of the shorter arm 12 of each loop 10 and 11 is connected by a bend 15 with one end of a medially disposed diagonal member 16. This leaves the two shorter arms 12 at opposite edges of the connector and the two longer arms 14 at opposite edges of the connector and in each instance a longer arm 14 is approximately aligned with a shorter arm 12 when the parts are in a closed position.

The bends 15 and the diagonal medial member 16 provide desirable resiliency which allows for some elongation of the connector under heavy tension, as hereinafter explained. The inner end portion of the longer arm 14 of each loop 10 and 11 is bent to form a hook 17. Preferably the hooks 17 on the two arms 14 are bent in opposite directions to provide better balance and a more symmetrical shape. The hook 17 on the longer arm 14 of each loop 10 and 11 is adapted to hook over the medial diagonal member 16 at the location of the bends 15 by which said medial diagonal member is connected with the shorter arm 12 of the opposite loop. The hooks 17 are well shielded by the loops 10 and 11 when they are in a hooked position and are not easily caught or snagged. Preferably the connector 16 is normally inclined at an oblique angle in the order of forty-five degrees relative to the longitudinal axis of the connector.

Figure 3:
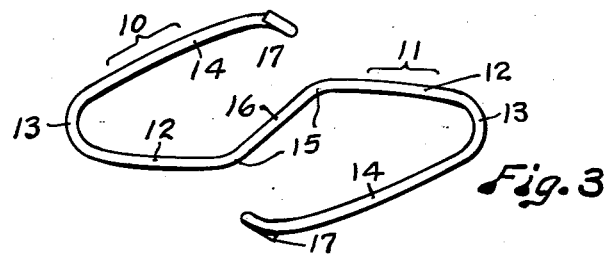
FIG. 3 is a side view similar to FIG. 1 except that the U-shaped end loops of the connector are shown in an open or unhooked position.

The hooks 17 can be readily disengaged from the medial diagonal member 16 by pressing the longer arm 14 which carries the hook inwardly and sidewise enough to release the hook and then allowing the arm 14 to spring outwardly into an open position, as shown in FIG. 3. In this open position the loops 10 and 11 are readily engaged with other parts of the tackle and it is apparent that the hooks 17 can be easily passed through small eyelets and loops of lures, flashers, lines, leaders and the like in making connections with and between the same.

Figure 4:
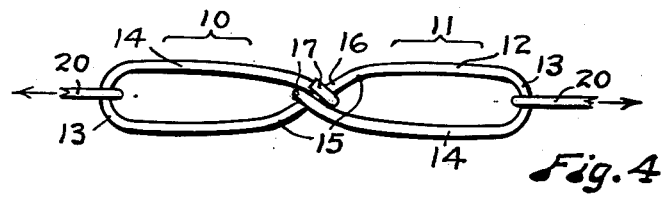
FIG. 4 is a side view similar to FIG. 1 illustrating positions which parts of the connector may assume when said connector is under heavy tension.

The construction of our connector, and particularly the provision of the diagonal medial member 16 and bends 15, provide desirable longitudinal elasticity which helps to cushion and absorb tensile shock and strain to which the tackle with which this connector is used is subjected. FIG. 4 is illustrative of the operation of this connector under heavy tension to which it may be subjected when connected with tackle, indicated schematically by 20. When heavy tension is applied the bends 15 yield resiliently and the diagonal member 16 tends to be drawn more nearly into longitudinal alignment with the connector. As this takes place the hooks 17 slide toward each other on the diagonal member 16 and, if the pull is heavy enough, these hooks may contact each other, as shown in FIG. 4. Under ordinary conditions of use the tensile strain on the connector will be cushioned to such an extent by the resilience of said connector that it will not cause the hooks 17 to straighten out and when the strain is released all parts will move back to their normal positions in which they are shown in FIG. 1.

The foregoing description and accompanying drawings clearly disclose a preferred embodiment of our invention but it will be understood that changes in the device may be made within the scope of the following claims.

We claim:

1. A fishing tackle connector formed of a single piece of spring wire comprising two opposed U-shaped loops of similar size and shape each having a longer arm and a shorter arm connected with each other by an arcuate outer end portion; a medial diagonal member integrally connected by resilient bend portions with the inner ends of the shorter arms of said loops and normally extending between said two shorter arms at an oblique angle in the order of forty-five degrees relative to the longitudinal axis of the connector; and a hook member on the inner end of the longer arm of each loop detachably engageable with the medial diagonal member substantially at the location where said medial diagonal member is connected with the shorter arm of the oppositely positioned U-shaped loop.

2. A figure eight type connector formed of a single piece of spring wire comprising two aligned U-shaped loops of similar size and shape each having a longer arm and a shorter arm integrally connected with each other by an arcuate outer end member; a medial diagonal member extending obliquely across the connector between the inner ends of the two U-shaped loops; two resilient integral bend portions connecting the inner ends of the shorter arms of the U-shaped loops with the respective ends of the medial diagonal member; and a hook provided on the inner end of the longer arm of each U-shaped loop, each hook being detachably engageable with said medial diagonal member adjacent the location of one of said resilient bend portions, said medial diagonal member and the bend portions connecting it with the shorter arms of said U-shaped loops being resiliently yieldable to tension exerted on the connector, the medial diagonal member being angularly movable by tension toward a position of longitudinal alignment with the connector and the hooks being movable toward each other on the medial diagonal member when said medial diagonal member is angularly moved by tension.

References Cited in the file of this patent

UNITED STATES PATENTS 2,720,014 Caldwell _____ Oct. 11, 1955

FOREIGN PATENTS 111,772 Great Britain _____ Dec. 13, 1917